R. W. SPRINGER.
WING OR PROPELLER FOR AERIAL DYNAMICS AND OTHER PURPOSES.
APPLICATION FILED AUG. 8, 1907. RENEWED MAR. 29, 1915.
1,231,444.
Patented June 26, 1917.
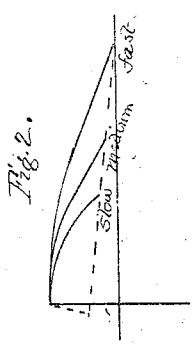
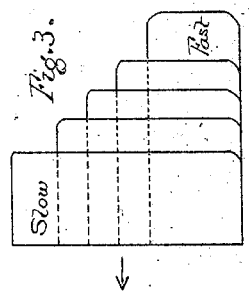
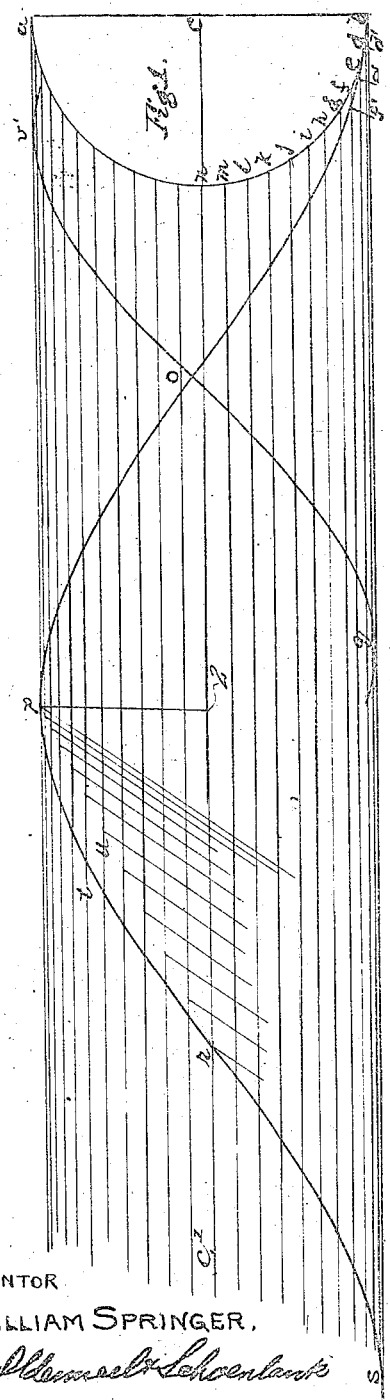
WITNESSES:
INVENTOR
RUTER WILLIAM SPRINGER,
BY
ATTORNEYS

UNITED STATES PATENT OFFICE.

RUTER WILLIAM SPRINGER, OF SPRINGFIELD, ILLINOIS.

WING OR PROPELLER FOR AERIAL DYNAMICS AND OTHER PURPOSES.

1,231,444.　　　　Specification of Letters Patent.　　Patented June 26, 1917.

Application filed August 3, 1907, Serial No. 387,635. Renewed March 29, 1915. Serial No. 17,961.

*To all whom it may concern:*

Be it known that I, RUTER WILLIAM SPRINGER, a citizen of the United States of America, residing at Springfield, in the State of Illinois, United States of America, have invented new and useful Wings or Propellers for Aerial Dynamics and other Purposes; and I do hereby declare the following to be a full, clear, and exact description of the same.

The object of this invention is to provide a wing of improved shape for use in aerial dynamics, which will most effectually and economically utilize the pressure of the air. This wing may be used upon a soaring machine, or upon a motor-driven aeroplane, or for the wings of an aviating, or flapping wing machine.

It is important that terms shall be used in this description which will have only one perfectly clear meaning; hence the following definitions:

The dimension of a wing in the direction of flight is more properly called its fore-and-aft; and the dimension of the wing at right angles to the fore-and-aft is called its spread. The angle of elevation or depression of the front edge of an aeroplane will be herein designated as its pitch. The term "wing," especially as used in the claims, is intended to be broad enough to cover a fixed aeroplane or an aviating aeroplane.

I have found that the proper curve for a wing will be the combination of equal fore-and-aft increments with simple harmonic motion. The curve, thus traced, is called a sinusoid.

Reference is to be had to the accompanying drawings, wherein Figure 1 is a diagram illustrating the manner of producing sinusoid curves, in various proportions, for the making of wings. Fig. 2 is a longitudinal vertical section, and Fig. 3 is a plan view of several superposed wings, illustrating the proportions of wings for rapid and slow flight.

In Fig. 1, the line $b\ o\ p\ t\ r\ s$ is a sinusoid curve formed by equal increments parallel with the line $c\ c^1$, and by increments of simple harmonic motion formed by equal arcs in the circle $b\ d\ e\ f\ g\ h\ i\ j\ k\ l\ m\ n\ a$. The line $v^1\ o\ q$ is another sinusoid, formed with the same elements of simple harmonic motion, and with shorter horizontal increments parallel with the line $c\ c^1$.

The manner of forming the curve, which is explained in books on general geometry, is as follows:—A circular arc $b\ n\ a$, having its center $c$, is first drawn; and from the center $c$ is drawn a straight line $c\ c^1$. The arc of the circle is subdivided into a number of short equal arcs at the points $b\ d\ e\ f\ g\ h\ i\ j\ k\ l\ m\ n$, etc. The line $a\ c\ b$ is drawn at right angles to the line $c\ c^1$; and from the point $b$ the line $b\ s$ is drawn parallel to the line $c\ c^1$. From each of the other points $d\ e\ f\ g\ h\ i\ j\ k\ l\ m$, etc., lines are drawn parallel to $c\ c^1$. On the line commencing at $d$ is marked a point $d^1$, which is a horizontal unit distant from the line $c\ b$. On the line commencing at $e$ is marked a point $e^1$, which is two units distant from the line $c\ b$. On the line commencing at $f$ is marked a point $f^1$, which is three units distant from the line $c\ b$. And so, on the lines commencing at $g\ h\ i$ and so on, the horizontal line increasing one for each increase in the length of the arc from the point $b$. Then the points $b$, $d^1$, $e^1$, $f^1$, etc., are all joined, producing the curve $b\ d^1\ e^1\ f^1\ o\ p\ t\ r\ s$,—which is a true sinusoid curve. It will be noted in this curve that the curvature increases most rapidly where the curve touches the lines $b\ s$ and $a\ p$, and that the curvature becomes zero and changes direction every time the sinusoid crosses the line $c\ c^1$; also that the sinusoid curve is moving downward most rapidly at the point where it is changing its direction of curvature; and that it is for a moment stationary as regards vertical motion when it touches the lines $a\ p$ or $b\ s$.

It is proposed to take one-fourth phase of the sinusoid curve $b\ o\ p\ t\ r\ s$, that is the part $p\ t\ r$, for a pattern for the fore and aft curvature of an aeroplane. The point $p$ represents the front edge, the point $r$ the rear edge, and the line $r\ e$ represents the direction of actual flight. The front edge of the aeroplane, therefore, strikes the air without producing any motion whatever. Gradually and with a regular increase, the air is put into simple harmonic motion, until its greatest downward motion is reached as it clears the rear edge of the aeroplane. We may presume that the simple harmonic motion of the air will be continued after the passage of the aeroplane; so that it will not come to rest until it reaches a point represented by the letter $s$.

Still referring to Fig. 1, the line $r^2$, representing the line of flight, is a direct function of the intended velocity of the plane or wing and is called the element of flight; the line $p^2$, by its length may indicate the back pressure of the air upon the plane when in flight; while the length of the line $r^2$, may indicate the lifting power of the air. Now as the percussive force of the air varies as the square of the velocity, it follows that if the velocity of the plane is doubled the back pressure of the air will be increased four times, so that if the length of the line $r^2$, be doubled, and the sinusoid curves of the supporting surface of the plane be stretched out accordingly, a given body of air will be twice as long in engagement with the aeroplane as it was before, while its back pressure will be just what it was at the slower speed, although its supporting power will be twice as great. What the actual length of the line representing the element of flight should be for any one velocity has not yet been accurately determined.

The horizontal units of increment correspond to the velocity of the wing. So it becomes evident that, for a more rapidly moving aeroplane, the horizontal increments will become longer, and for a more slowly moving aeroplane, the horizontal increments will become shorter.

In Fig. 2 are represented, in longitudinal vertical section, and diagrammatically, three aeroplanes or wings intended for slow, medium and rapid flight, the wings being considered from left to right. This view exhibits the differences of curvature between the several wings, and at the same time illustrates the fact that each wing, although differing from each other one, is of a true sinusoid curve in longitudinal cross section.

Fig. 3 represents in plan view, diagrammatically, and superposed for the sake of comparison, a series of five aeroplanes intended for different degrees of speed in flight, the one intended for slowest speed being represented on top, and that for fastest speed at the bottom.

If a rule is desired for platting a wing or aeroplane adapted to a certain speed in the air, the following may be taken, assuming four inches in a fore and aft direction as a basis of calculation.

Professor Langley has shown that the angle of two degrees will correspond to a velocity of fifty miles per hour, five degrees for forty miles, ten degrees for thirty-one miles, etc. Thus it will be seen that, approximately, a wing formed for a speed of fifty miles per hour (two degrees) will have two and one-half times as much fore-and-aft as one for forty miles (five degrees).

Professor Langley's complete deductions, for a four-inch plane, fore-and-aft, are approximately as follows:

| Miles per hour... | 24 | 25 | 26 | 27 | 30 | 31 | 32 | 34 | 37 | 39 | 40 | 43 | 46 | 50 |
|---|---|---|---|---|---|---|---|---|---|---|---|---|---|---|
| Degrees of elevation......... | 19 | 17 | 15 | 13 | 11 | 10 | 9 | 7.5 | 7 | 6 | 5 | 3 | 2.5 | 2 |

Referring to Fig. 1, let the angle $c\ r\ p$ equal the angle of attack for the intended speed. For convenience the present calculations will be formed on that part of the curve designated $b\ o$: then $b\ o\ c$ equals $p\ r\ c$, taking the straight line between $b$ and $o$. The present aeroplanes which make about 50 miles per hour, are about 6 ft. in fore-and-aft dimensions, and this may be taken as empirically satisfactory for the present discussion. The Langley angle of attack for 50 miles per hour is 2°, as stated above. The tangent of 2° is .03492; therefore with 6 ft. or 72 inches for the radius $o\ c$, the tangent $c\ b$ would be 72 inches multiplied by .03492, which equals 2.51424 inches, and the curve $b\ d'\ e'\ f'\ o$ may be developed as previously explained. It is evident that the curve $b\ o\ p\ r$ shown in Fig. 1 is intended for a slower speed than 50 miles per hour, as the angle $c\ r\ p$ is about 27°, which would correspond with a speed of something less than 20 miles per hour. If a speed of 40 miles per hour be assumed the angle $c\ r\ p$ will be 5°, and the tangent of this angle is .08749. If the line $c\ o$ be shortened in proportion to the reduction of speed it will be $$\frac{40}{50} \times 72 = 57.6,$$

the fore-and-aft dimensions, in inches, of an aeroplane intended for this speed, 40 miles per hour. Then the line $c\ b$ will be 57.6 inches multiplied by .08749, which equals 5.039 inches. It is thought that, owing to the superior efficiency of aeroplanes of the type described in this case, probably a somewhat smaller angle of attack will be found sufficient, and that this will be effected by lengthening the line $c\ o$, giving greater support for the same speed of flight.

Now, if each horizontal increment be taken as equal to four inches; and since the number of circular increments in one-quarter phase equals ninety degrees divided by the angle of pitch,—it follows that the correct fore-and-aft of wings adapted to certain speeds will be about as follows:

| Miles per hour....... | 24 | 26 | 31 | 32 | 34 | 37 | 40 | 43 | 46 | 50 |
|---|---|---|---|---|---|---|---|---|---|---|
| Inches fore-and-aft.. | 20 | | | 40 | | 52 | | 110 | | |
| Feet fore-and-aft.... | | 2 | 3 | | 4 | | 6 | | 12 | 16 |

It is evident that, according to the above rule, all wings will have the same absolute shape, larger or smaller. It is probable that experience will show that the horizontal increment should preferably bear a different ratio to the circular increment than 1:1. In that case, a suitable modulus must be employed, but the curve will nevertheless be a true sinusoid, differing as the lines *b o p* and *v o q*, or as those shown in Fig. 2. Otherwise it may be desirable to shorten the wing by cutting off some of the rear edge, leaving the rest as it was.

Other factors entering in, and more accurate observations and calculations, will no doubt require more or less modification of the above results; but, as given, they are the best now obtainable, and the principles herein enunciated will forever remain the same.

The structure of the wing may be any suitable one desired. Lightness and strength will, of course, be aimed at under all circumstances. The wing may be of substantially uniform width throughout its fore-and-aft, and of substantially uniform thickness, and strengthened and maintained in desired curved shape by any means desired.

What I claim is:

1. A wing for aerial dynamics and other purposes, comprising a body whose fore-and-aft is formed to correspond to a sinusoid curve, the point of greatest curvature being at the front edge of said body and the point of zero curvature being at the rear edge, thus comprising one-fourth phase of the said curve.

2. A wing for use in aerial dynamics the acting surface of which is so developed that its lines in the direction of its intended motion of progression are sinusoid curves, the linear elements of which curves are proportional to the velocity at which the wing is intended to progress being longer for rapid and shorter for slow flight.

3. A wing for use in aerial dynamics comprising a body with a surface that acts on the air through which the wing progresses, such surface having fore-and-aft dimensions formed to correspond with substantially one-fourth phases of true sinusoid curves.

4. A wing for aeroplanes, the acting surface of which is developed so that its lines in the direction of its intended motion of progression are sinusoid curves, the linear elements of which curves are approximate functions of the velocity of progression which the said wing is intended to maintain and are each approximately equal to one-fourth phase of the said sinusoid curves.

In testimony whereof, I have signed my name to this specification in the presence of two subscribing witnesses.

RUTER WILLIAM SPRINGER.

Witnesses:
WILLIAM W. ADAMS,
WALTER H. BESTROM.